(12) United States Patent
Dunleavy et al.

(10) Patent No.: US 9,238,332 B2
(45) Date of Patent: Jan. 19, 2016

(54) PROTECTIVE MATERIAL ARRANGEMENT

(71) Applicant: BAE SYSTEMS plc, London (GB)

(72) Inventors: Michael Dunleavy, South Gloucestershire (GB); Sajad Haq, South Gloucestershire (GB); Caroline Joleen Morley, South Gloucestershire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 14/358,779

(22) PCT Filed: Nov. 6, 2012

(86) PCT No.: PCT/GB2012/052756
§ 371 (c)(1),
(2) Date: May 16, 2014

(87) PCT Pub. No.: WO2013/072668
PCT Pub. Date: May 23, 2013

(65) Prior Publication Data
US 2014/0311327 A1    Oct. 23, 2014

(30) Foreign Application Priority Data

Nov. 17, 2011   (GB) .................................. 1120033.4

(51) Int. Cl.
*F41H 5/02*      (2006.01)
*B29C 70/02*     (2006.01)
*F41H 5/04*      (2006.01)
*B64D 7/00*      (2006.01)
(Continued)

(52) U.S. Cl.
CPC ................ *B29C 70/021* (2013.01); *B64D 7/00* (2013.01); *F41H 1/02* (2013.01); *F41H 5/0478* (2013.01); *F41H 5/0485* (2013.01); *F41H 7/00* (2013.01)

(58) Field of Classification Search
CPC .... F41H 5/0485; F41H 5/0464; F41H 5/0478
USPC ...................... 89/36.02, 36.05, 904, 905, 909, 89/914–916
See application file for complete search history.

(56) References Cited

U.S. PATENT DOCUMENTS 3,828,699 A    8/1974   Bowen
4,186,648 A    2/1980   Clausen et al.
(Continued)

FOREIGN PATENT DOCUMENTS

WO    2004103231 A1    12/2004
WO    20060121411 A1   11/2006
(Continued)

OTHER PUBLICATIONS

International Search Report and Written Opinion of the International Searching Authority received for Patent Application No. PCT/GB2012/052756, mailed on Feb. 5, 2013, 16 pages.
(Continued)

*Primary Examiner* — Samir Abdosh
(74) *Attorney, Agent, or Firm* — Finch & Maloney PLLC

(57) ABSTRACT

According to the invention there is provided an arrangement of protective material for dissipating the kinetic energy of a moving object including one or more layers of fibrous armour material encased within a sealed encasement, in which the sealed encasement is formed from a textile armour material which is impregnated with a polymeric substance.

21 Claims, 1 Drawing Sheet

Figure 1:
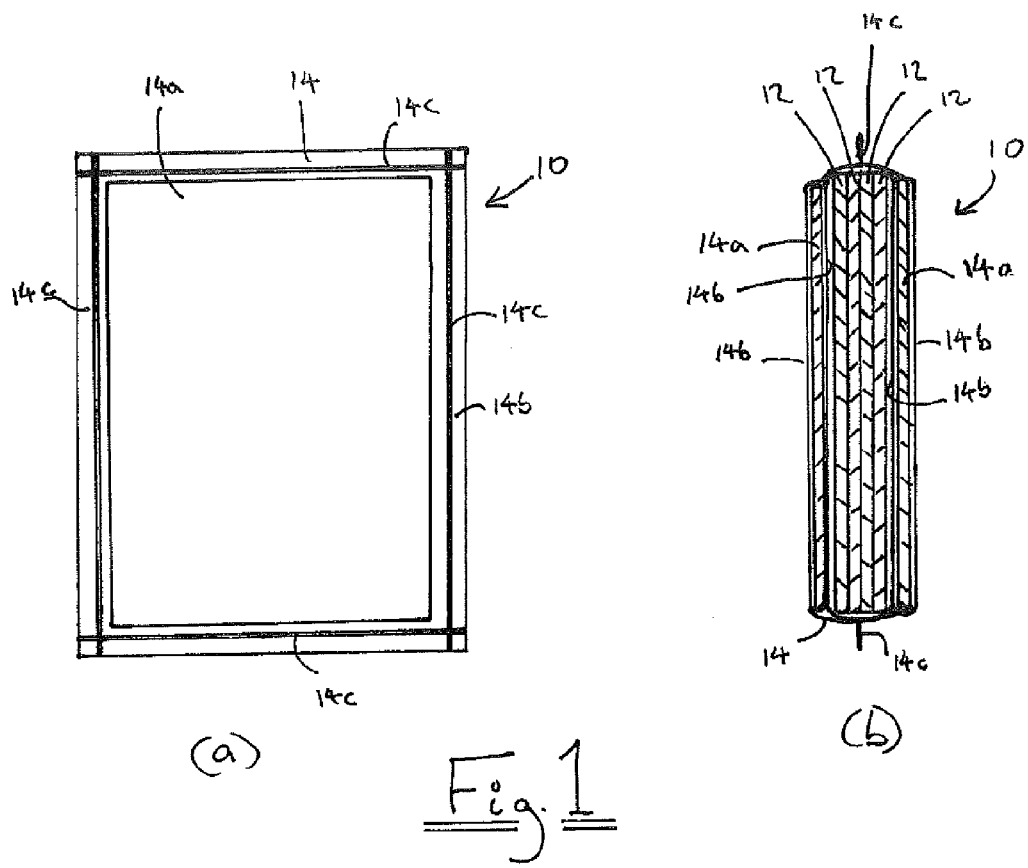

(51) Int. Cl.
F41H 1/02 (2006.01)
F41H 7/00 (2006.01)

(56) References Cited

U.S. PATENT DOCUMENTS

| | | | | |
|---|---|---|---|---|
| 4,200,677 | A * | 4/1980 | Bottini et al. | 442/254 |
| 4,292,882 | A * | 10/1981 | Clausen | 89/36.02 |
| 4,404,889 | A * | 9/1983 | Miguel | 89/36.02 |
| 4,539,253 | A | 9/1985 | Hirschbuehler et al. | |
| 4,678,702 | A * | 7/1987 | Lancaster et al. | 428/193 |
| 4,879,165 | A | 11/1989 | Smith | |
| 5,061,545 | A * | 10/1991 | Li et al. | 428/195.1 |
| 5,167,876 | A * | 12/1992 | Lem et al. | 252/602 |
| 5,739,184 | A | 4/1998 | Marbry et al. | |
| 5,796,028 | A * | 8/1998 | Field et al. | 89/36.05 |
| 7,226,878 | B2 | 6/2007 | Wagner et al. | |
| 7,498,276 | B2 | 3/2009 | Wagner et al. | |
| 7,825,045 | B1 | 11/2010 | Wagner et al. | |
| 8,132,494 | B1 | 3/2012 | Nguyen et al. | |
| 8,322,268 | B1 * | 12/2012 | Booher, Sr. | 89/36.02 |
| 8,627,756 | B1 * | 1/2014 | Booher, Sr. | 89/36.02 |
| 2002/0037391 | A1 * | 3/2002 | Harpell et al. | 428/103 |
| 2003/0129900 | A1 * | 7/2003 | Chiou | 442/134 |
| 2005/0266748 | A1 | 12/2005 | Wagner et al. | |
| 2006/0234577 | A1 | 10/2006 | Wagner et al. | |
| 2006/0252325 | A1 | 11/2006 | Matsumura et al. | |
| 2006/0252328 | A1 * | 11/2006 | Bingenheimer | 442/180 |
| 2009/0311930 | A1 * | 12/2009 | Wang et al. | 442/134 |
| 2010/0269236 | A1 | 10/2010 | Wagner et al. | |
| 2010/0275765 | A1 | 11/2010 | LaGrotta et al. | |
| 2011/0041675 | A1 * | 2/2011 | Ermalovich | 89/36.02 |
| 2011/0072959 | A1 | 3/2011 | Petrovich et al. | |
| 2011/0113534 | A1 | 5/2011 | Sauer et al. | |
| 2012/0137865 | A1 * | 6/2012 | Citterio et al. | 89/36.02 |
| 2012/0171477 | A1 | 7/2012 | Sang et al. | |
| 2012/0177869 | A1 * | 7/2012 | Micarelli | 428/105 |
| 2014/0311328 | A1 | 10/2014 | Haq et al. | |
| 2014/0311329 | A1 * | 10/2014 | Dyke et al. | 89/36.02 |

FOREIGN PATENT DOCUMENTS

| | | |
|---|---|---|
| WO | 2008061170 A1 | 5/2008 |
| WO | 2008097362 A1 | 8/2008 |
| WO | 2010096037 A1 | 8/2010 |
| WO | 2011112590 A2 | 9/2011 |
| WO | 2012005785 A2 | 1/2012 |
| WO | 2013072667 A1 | 5/2013 |
| WO | 2013072668 A1 | 5/2013 |
| WO | 2013072669 A1 | 5/2013 |

OTHER PUBLICATIONS

GB Intellectual Property Office Search Report under Section 17(5) received for GB Patent Application No. 1120033.4 mailed Feb. 20, 2012, 3 pages.

International Prelim. Report on Patentability and Written Opinion received for Patent Application No. PCT/GB2012/052755, mailed on May 30, 2014, 8 pages.

International Search Report and Written Opinion of the International Searching Authority received for Patent Application No. PCT/GB2012/052755, mailed on Jan. 31, 2013, 15 pages.

GB Intellectual Property Office Search Report under Section 17(5) received for GB Application No. 1120031.8 mailed on Feb. 17, 2012, 3 pages.

Mayo, et al., "Stab and puncture characterization of thermoplastic-impregnated aramid fabrics", Elsevier, International Journal of Impact Engineering, vol. 36, 2009, pp. 1095-1105.

International Prelim. Report on Patentability and Written Opinion received for Patent Application No. PCT/GB2012/052757, mailed on May 30, 2014, 9 pages.

International Search Report and Written Opinion of the International Searching Authority received for Patent Application No. PCT/GB2012/052757, mailed on Jan. 30, 2013, 15 pages.

GB Intellectual Property Office Search Report under Section 17(5) received for GB Application No. 1120032.6 mailed on Feb. 20, 2012, 3 pages.

Egres, et al., "Stab Resistance of Shear Thickening Fluid (STF)—Kevlar Composites for Body Armor Applications," Proceedings of the 24th Army Science Conference, Orlando, Florida, Nov. 29, 2004 through Dec. 2, 2004, 8 pages.

International Preliminary Report on Patentability and Written Opinion received for Patent Application No. PCT/GB2012/052756, mailed on May 30, 2014, 9 pages.

* cited by examiner

PROTECTIVE MATERIAL ARRANGEMENT

This invention relates to arrangements of protective material, methods of producing same and articles manufactured therefrom.

Body armour is used by personnel in various fields to afford protection against a variety of impact events. The body armour may be intended to provide anti-ballistic protection, ie, protection against projectiles and bodies such as splinters or other fragmentary material moving at high velocity. Also, body armour may be used to provide spike resistance, such as against blades and other sharp weapons, or needles. It is well known to manufacture body armour from a plurality of layers of a polyaramid fabric such as Kevlar®, which is poly(paraphenylene terephthalamide), or a similar material. It has been proposed to improve the properties of this type of body armour by impregnating at least some of the layers of fabric with a shear thickening fluid (STF). Protective material of this type for use in body armour is described in U.S. Pat. Nos. 7,226,878, 5,854,143, US2004/0094026 and US2006/0040576. STF's are non-Newtonian fluids which exhibit substantial increases in viscosity under the application of a shearing force. The intention of using fabric which is impregnated with STF as body armour is to improve anti-ballistic properties and flexibility. However, the present inventors have discovered that, in at least some embodiments, the use of layers of aramid fabric which have been impregnated with a STF actually results in a deterioration in anti-ballistic properties. Mayo, Jr et al (Int. J. Impact Eng. 36 (2009) 1095-1105) describes an investigation into the stab resistance of an aramid fabric which has been hot pressed with Surlyn®, an ethylene-methacrylic acid copolymer. However, this paper does not investigate anti-ballistics properties, or suggest optimised structures for providing anti-ballistic protection.

The present invention, in at least some of its embodiments, addresses the above described problems and desires. It has been found that the approach adopted in the present invention can provide improved results with protective materials which are not impregnated with a STF, as well as protective materials which are impregnated with a STF. Accordingly, the present invention is not limited to protective materials of the type comprising one or more layers of fabric impregnated with a STF.

According to a first aspect of the invention there is provided an arrangement of protective material for dissipating the kinetic energy of a moving object including one or more layers of fibrous armour material encased within a sealed encasement, in which the sealed encasement is formed from a textile armour material which is impregnated with a polymeric substance.

Advantages associated with at least some embodiments of the invention include flexibility, reduced bulkiness, reduced thickness and improved ballistic properties, such as back face trauma signature. Additionally, the encasement provides a controlled environment for the layers of fibrous armour material.

Preferably, impregnation of the textile armour material with the polymeric substance is achieved by forming the encasement from a laminate between the textile armour material and one or more layers of the polymeric substance.

The encasement may be formed from a plurality of layers of textile armour material which are impregnated with the polymeric substance, said layers of textile armour material being sealed together to provide the encasement. Said layers of textile armour material are preferably heat sealed together.

Advantageously, the encasement substantially prevents the ingress or egress of solvent to or from the layers of fibrous armour material. This assists in maintaining a controlled environment within the encasement.

Generally, the polymeric substance is a synthetic polymeric substance.

Preferably, the polymeric substance is an ionomer. Ionomers are a class of polymers which have electrically neutral repeat units and a fraction of ionised repeat units (typically 15 percent or less). At least some ionomers offer the possibility of self-healing. In preferred embodiments, the ionomer is an ethylene-acid copolymer. More preferably, the ionomer is an ethylene-methacrylic acid copolymer.

Preferably, the ethylene-acid copolymer is at least partially neutralised with an ion, which may be a metal ion such as a sodium, zinc or lithium ion. A preferred example of an ionomer is Surlyn®, which is available in a range of resin formulations from DuPont, Wilmington, Del. 19805, USA). Surlyn® offers the possibility of self-healing after an impact event.

In some embodiments, at least one layer of the encased fibrous armour material is impregnated with a shear thickening fluid. Preferably, the majority of the layers of fibrous armour material are impregnated with a shear thickening fluid. However, embodiments in which a minority or even none of the layers of fibrous armour material are impregnated with a shear thickening fluid are within the scope of the invention.

All of the layers of fibrous armour material may be impregnated with the shear thickening fluid. However, it may be advantageous to position the plurality of layers of fibrous armour material impregnated with the shear thickening fluid behind and/or in front of one or more layers of fibrous armour material which are not impregnated with a shear thickening fluid.

The shear thickening fluid may include particles suspended in a liquid. The particles may be inorganic particles or polymers as is well known in the art. Examples of particles include silica, other oxides, calcium carbonate, and polymers such as polystyrene and poly(methyl methacrylate) and related copolymers.

The liquid may be an organic solvent, a silicone based solvent or aqueous liquid. Examples of organic solvents include glycols such as ethylene glycol and polyethylene glycol, and ethanol. Examples of silicone based solvents include silicon oils and phenyltrimethicone.

Alternatively, the shear thickening fluid may be a polymer.

The use of the sealed encasement in conjunction with one or more layers of STF-impregnated fibrous armour material is advantageous, because the controlled environment within the encasement can assist in maintaining the useful properties and/or the composition of the STF. For example, the volume fraction of a solvent in the STF can be maintained at or near to a desired value over a period of time.

The layers of fibrous armour material and the textile armour material that the encasement is formed from are typically each in the form of a suitable textile layer produced by a textile production technique such as weaving. Non-woven textile layers may be used.

The fibrous armour material and/or and the textile armour material that the encasement is formed from preferably contains aramid fibres, typically poly (paraphenylene terephthalamide) fibres (Kevlar®). Other high strength fibres which are able to dissipate the kinetic energy of moving objects may be used to form the fibrous armour material. Examples of such fibres include graphite, nylon, glass fibres, nanofibres, and other high strength polymeric fibres such as high strength polyethylene.

In some embodiments, the arrangement includes a plurality of layers of fibrous armour material, and at least some adjacent layers of fibrous armour material are separated by one or more separator layers. In these embodiments, it is preferred that at least one pair of adjacent layers of fibrous armour material are impregnated with a shear thickening fluid and separated by one or more separator layers.

Preferably, the separator layer is a discrete layer of a material. The discrete layer may be present as a sheet or film.

The material may be formed from a polymeric material. A preferred example of a suitable polymeric material is polyimide.

The polymeric substance may provide self-healing of the arrangement in the event of an impact event. Examples of impact events include ballistic events and spike impacts. Ballistic events include projectiles and bodies such as splinters or other fragmentary material moving at high velocity. Spike impacts include impacts from blades, other sharp weapons, and needles.

According to a second aspect of the invention there is provided a method for producing an arrangement of protective material for dissipating the kinetic energy of a moving object including the steps of:

providing one or more layers of fibrous armour material;

positioning the layers of fibrous armour material within an encasement formed from a textile armour material which is impregnated with a polymeric substance; and sealing the encasement so that the layers of fibrous armour material are encased within a sealed encasement.

Preferably the encasement is sealed by heat sealing.

According to a third aspect of the invention there is provided an article of body armour including an arrangement of protective material for dissipating the kinetic energy of a moving object including one or more layers of fibrous armour material encased within a sealed encasement, in which the sealed encasement is formed from a textile armour material which is impregnated with a polymeric substance.

According to a fourth aspect of the invention there is provided a vehicle including an arrangement of protective material for dissipating the kinetic energy of a moving object including one or more layers of fibrous armour material encased within a sealed encasement, in which the sealed encasement is formed from a textile armour material which is impregnated with a polymeric substance.

The arrangement of protective material may be present as a lining for a cabin area of the vehicle in order to protect occupants of the vehicle from external moving objects.

The vehicle may be in the form of a motorised land vehicle or an aircraft. Where the vehicle is in the form of an aircraft, the arrangement of protective material may be present as an engine lining.

According to a fifth aspect of the invention there is provided a flexible structure for mitigating the effects of blast events including an arrangement of protective material for dissipating the kinetic energy of a moving object including one or more layers of fibrous armour material encased within a sealed encasement, in which the sealed encasement is formed from a textile armour material which is impregnated with a polymeric substance.

The flexible structure may be in the form of a tent or a blanket.

Whilst the invention has been described above, it extends to any inventive combination of the features set out above, or in the following description, drawing or claims.

Figure 2:
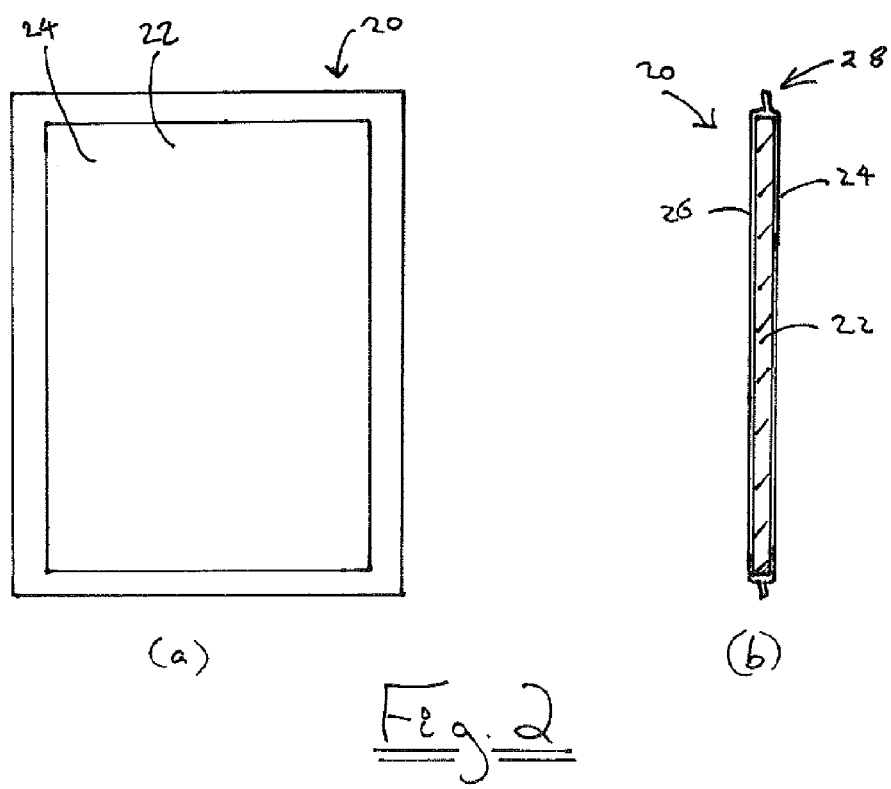

Embodiments of the present invention will now be described, by way of example only, with reference to the accompanying drawings, in which:

FIG. 1 shows (a) a plan view and (b) a cross-sectional view of a protective material of the invention; and FIG. 2 shows (a) a plan view and (b) a cross-sectional view of a sheet laminated with an ionomer.

FIG. 1 depicts an arrangement of protective material of the invention, shown generally at 10, comprising a plurality of fabric layers 12, formed from fibres of an armour material such as Kevlar®, which are encased within a sealed encasement 14. In the embodiment shown in FIG. 1, the encasement 14 is formed from a textile armour material 14a such as Kevlar (RTM) laminated with layers 14b of an ionomer such as Surlyn®. The encasement 14 is sealed along seal lines 14c formed in the layers 14b of the ionomer. Conveniently, this can be achieved by heat sealing. FIG. 2 shows a sheet 20 which can be used as a precursor of the encasement 14. The sheet 20 comprises a layer of a textile armour material 22 which is laminated on its front and back faces with a first layer 24 and a second layer 26, respectively, of an ionomer. Lamination can be accomplished readily by the application of heat and pressure. Advantageously, the dimensions of the first and second layers 24, 26 of the ionomer are greater than those of the layer of a textile armour material 22 so that there is a perimeter region 28 of ionomer which surrounds the edges of the layer of a textile armour material 22. The arrangement of protective material can be produced by providing two sheets 20, placing the plurality of fabric layers between the two sheets 20 and heat sealing along the perimeter regions 28 of the sheets 20.

A number of ballistic tests were performed on various samples according to methodologies which will now be described. The samples were intimately held against the surface of a witness clay block with strips of elastic. The clay block was conditioned prior to testing in a 30° C. oven for three hours and the face of the block was smoothed to ensure a flat surface was provided. A 4.1 g, 10 mm diameter steel spherical projectile was fired at the samples from a gas gun, which is positioned with respect to the clay block to provide a projectile free flight of about 2 m. Careful alignment of the gas gun and target system ensured that the impact on the target was better than ±5 mm of the specified impact point. Prior to impact, the steel projectile passed through a velocity measurement apparatus in the form of two magnetic induction coils. The passage of the projectile through the magnetic field induces a current in the coils. The distance between the coils is known accurately, and hence an estimate of the projectile velocity can be made from the time taken for the projectile to travel between the coils. The method has an accuracy of better than ±2%.

Optical images of the projectile and the deformation of the samples upon impact were captured using a high speed camera positioned obliquely to one side of the target to enable observation of the front face of the sample during impact. The performance of the samples was investigated by comparing the penetration depth and the profile of the penetration of the sample and/or projectile into the clay block. The profile of the penetration is also referred to herein as the back face trauma signature. Measurements of the penetration depth and diameter of the impact area were made from plaster casts of the witness clay using Vernier height callipers. An error of ±1 mm was assigned to each measurement of penetration depth, and an error of ±5% was assigned to the calculation of the impact area. This calculation was made using the diameter of the impact area on the basis of an elliptical impact shape.

Some of the samples tested utilised layers of Kevlar impregnated with a silica STF. Colloidal silica in ethylene glycol at a volume fraction of 57% or below was used as the STF. Layers of Kevlar® were impregnated with STF at a loading of 10 g of the STF per layer of Kevlar®

Surlyn® has demonstrated self-healing as a stand alone structure after penetration by a pointed projectile. However, the self-healing is limited, and will likely reduce substantially with impacts with yaw. Experiments were performed to investigate the performance of Surlyn® in combination with a fabric. In an initial experiment, a sheet of fabric was placed behind a sheet of Surlyn® and a ballistic test was performed. Post impact analysis of the sample shows that as the projectile passes through the sample the Surlyn® is pulled into the broken fabric yarns, and consequently cannot return to its original position. Therefore, healing does not occur. In a further experiment, Surlyn® laminated Kevlar® sheets were produced of the type shown in FIG. 2. The structures were prepared by sandwiching a 180×200 mm sheet of Kevlar® between two 100 μm thick sheets of Surlyn®. This structure was then placed between two sheets of a PTFE release fabric and put into a hot press at 190° C. for 2 minutes with the application of 100 psi pressure. During this process, the Surlyn® is melted and forced into the fabric weave, making an intimate contact. Ballistic tests on this Surlyn® laminated structure show that yarn breakage occurs and the fabric is pulled though the hole formed by the projectile, preventing healing at the site of impact.

A number of scale-up tests were performed using multiple layers of Kevlar®. In some samples, 10 layers of Kevlar® were impregnated with 100 g of the silica STF. The samples prepared for the scale-up tests are shown in Table 1, below. Sample A comprised 10 layers of the STF impregnated Kevlar® in which the Kevlar® layers were sandwiched between two sheets of polyimide. The purpose of the polyimide layers is to act as friction reducing layers to reduce inter-ply friction. Sample B comprised 31 layers of unimpregnated Kevlar® with no interleaving polyimide sheets. Sample C comprised the Kevlar®/STF/polyimide composite of Sample A encased within a bag formed from two 100 μm thick sheets of Surlyn®. Sample D comprised the Kevlar®/STF/polyimide composite of Sample A encased within an encasement of the type shown in FIG. 1. The encasement was formed from two sheets of Surlyn® laminated Kevlar®, each prepared by sandwiching a 180×200 mm sheet of Kevlar® between two 100 μm thick sheets of Surlyn® and hot pressing, as described above. The encasement was formed by subsequent heat sealing as described above in relation to FIGS. 1 and 2.

TABLE 1

Description of samples used for ballistic testing

| Sample | Number of Kevlar (RTM) Layers | Mass of STF added (g) | Number of polyimide sheets | Encasement? | Areal density (kg/m$^2$) |
|---|---|---|---|---|---|
| A | 10 | 100 | 18 | no | 5.85 |
| B | 31 | 0 | 0 | no | 5.76 |
| C | 10 | 100 | 18 | yes[a] | 6.05 |
| D | 10 | 100 | 18 | yes[b] | 6.05 |

[a]Surlyn (RTM) encasement
[b]Surlyn (RTM) laminated Kevlar (RTM) encasement

Post impact analysis of Sample C revealed that a plug of Surlyn® was removed as the projectile passed through the encasement and was caught by the STF impregnated Kevlar®. With Sample D, the projectile passed through the encasement but a plug of material was not removed from the encasement. Yarn breakage at the impact site was evident, but the area of damage was smaller than the size of the spherical projectile.

The performance of Samples A, B and D will now be compared. Sample A essentially corresponds to Sample D without the encasement. The areal densities of Samples A and D are similar, with the areal density of Sample D being 3% greater. Sample D has an areal density which is 5% greater than the areal density of Sample B. However, the thickness of Sample D is approximately 45% less than the thickness of Sample B. Comparison of the images of casts of the witness clays demonstrates that the performance of Sample D is superior to that of Sample B at an impact velocity of 309 m/s. With Sample B, the projectile penetration depth was 17 mm and the impact diameter was 45 mm. With Sample D, the projectile penetration depth was 8 mm and the impact diameter was 50 mm. It can be seen that Sample D has a significantly lower penetration depth (45±4% lower), and an impact area which is 33±5% greater than that of Sample B. At an impact energy of 303 m/s, Sample A exhibited a projectile penetration depth of 19 mm and an impact diameter of 54 mm. The projectile penetration depth with Sample D is significantly lower at 8 mm.

Review of video footage of the impacts on Samples B (31 layers of untreated Kevlar®) and D clearly shows a difference in behaviour during impact. During the initial stages of the impact event on Sample B, the projectile forces the untreated Kevlar® ahead of it, thereby penetrating into the clay. The region of clay affected by this process during the initial stages is broad. As penetration proceeds, the Kevlar® remains unperforated and thus is drawn into the hole caused by the impact, leading to creasing of the unsupported Kevlar®. The behaviour of Sample D during impact is very different. Upon impact, there is a localised deformation, and stress waves emanating from the projectile cause the Kevlar® material to undergo increased stiffness. This material is then forced onto the clay backing by the projectile. As the impact proceeds, the penetration of the projectile into the material is seen to be highly localised, and the projectile subsequently disappears completely into Sample D. The zone of stiffened material spreads out from the point of impact, causing further deformation of the clay backing. This larger area of deformation within the clay contributes to increased dissipation of the impact energy. A ridge (rather like a bow wave) is observed also in the material, defining a boundary between the stiffened and unstiffened material. This region attains a maximum spread, and then contracts as it deforms the clay backing. Bulk movement of the sample occurs, leading to creasing, but this happens to a lesser extent than with Sample B.

Numerous variations on the principles and systems disclosed above are within the scope of the invention. For example, it is possible to use fibrous armour material other than Kevlar®. The fibrous armour material can be present as a woven or a non-woven textile layer. Polymeric substances other than ionomers might be used to impregnate the textile armour material in the encasement. The separator layer maybe present as a discrete layer interposed between adjacent layers of the armour material, or it may be in intimate contact with a layer or layers of armour material. Alternatively still, the separator layer may be present as a coating on the armour material.

Protective materials of the invention can be used in a variety of soft body armour systems. The advantageous property of flexibility can be exploited in order to provide body armour to protect regions of the body which are difficult to protect using conventional materials. For example, it is difficult to provide protection for the neck region due to interference between body armour and any headwear worn by an individual, particularly when in a prone position. Protective material of the invention may be used to provide an anti-ballistic and/or spike resistant collar which is sufficiently flexible to address this problem. Protective material of the invention may be combined with other protective systems. For example, the protective material may be placed behind another armour system such as ceramic armour plates to reduce back face trauma. Such systems could increase the extent of the protection offered and/or reduce the thickness of the armour pack. Pouches of protective material may be provided for this purpose. Spike resistant or anti-ballistic body armour can be made using protective material of the invention. A multiple threat armour which provides spike and ballistic protection can be produced using two or more different protective materials, in which an outer structure is configured to mitigate spike threats and an inner structure is configured to provide ballistic protection.

Protective material of the invention can be used for purposes other than body armour. Examples include spall liners for vehicles, blast tents or like structures for blast containment, and engine or turbine linings, especially linings for aircraft engines, for containing detached moving parts or fragments.

The invention claimed is:

1. An arrangement of protective material for dissipating the kinetic energy of a moving object including one or more layers of fibrous armour material encased within a unitary sealed encasement, in which the unitary sealed encasement is formed from a textile armour material which is impregnated with a polymeric substance and is not sealed to the one or more layers of fibrous armour material.

2. An arrangement according to claim 1 in which the unitary sealed encasement is formed from a laminate between the textile armour material and one or more layers of the polymeric substance.

3. An arrangement according to claim 2 in which the textile armour material includes a plurality of layers of textile armour material which are impregnated with the polymeric substance, said layers of textile armour material being sealed together to provide the unitary sealed encasement.

4. An arrangement according to claim 3 in which said layers of textile armour material are heat sealed together.

5. An arrangement according to claim 1 in which the unitary sealed encasement completely surrounds and encases the layers of fibrous armour material thereby substantially preventing the ingress or egress of solvent to or from the layers of fibrous armour material.

6. An arrangement according to claim 1 in which the polymeric substance is an ionomer.

7. An arrangement according to claim 6 in which the ionomer is an ethylene-acid copolymer.

8. An arrangement according to claim 7 in which the ionomer is an ethylene-methacrylic acid copolymer.

9. An arrangement according to claim 7 in which the ethylene-acid copolymer is at least partially neutralised with an ion.

10. An arrangement according to claim 9 in which the ion is a metal ion.

11. An arrangement according to claim 10 in which the metal ion is a sodium, zinc or lithium ion.

12. An arrangement according to claim 1 in which at least one layer of the encased fibrous armour material is impregnated with a shear thickening fluid.

13. An arrangement according to claim 12 in which the shear thickening fluid includes particles suspended in a liquid.

14. An arrangement according to claim 1 including a plurality of layers of fibrous armour material, in which at least some adjacent layers of fibrous armour material are separated by one or more separator layers.

15. An arrangement according to claim 14 in which at least one pair of adjacent layers of fibrous armour material are impregnated with a shear thickening fluid and separated by one or more separator layers.

16. An arrangement according to claim 1 in which the polymeric substance provides self-healing of the arrangement in the event of an impact event.

17. A method for producing an arrangement of protective material for dissipating the kinetic energy of a moving object, the method comprising:
    providing one or more layers of fibrous armour material;
    providing an encasement formed from a textile armour material which is impregnated with a polymeric substance;
    positioning the one or more layers of fibrous armour material within the encasement; and
    sealing the encasement thereby forming a unitary sealed encasement so that the one or more layers of fibrous armour material are encased within the unitary sealed encasement, wherein the unitary sealed encasement is not sealed to the one or more layers of fibrous armour material.

18. An article of body armour including an arrangement of protective material according to claim 1.

19. A vehicle including an arrangement of protective material according to claim 1, wherein the arrangement of protective material is present as an aircraft engine lining.

20. An arrangement according to claim 1, wherein the textile armour material of the unitary sealed encasement comprises a sheet having a plurality of edges, and wherein the polymeric substance surrounds and seals the edges of the sheet of textile armour material.

21. The method according to claim 17, wherein the encasement has a perimeter region in which the polymeric substance surrounds the textile armour material, and wherein the encasement is sealed along the perimeter region.

* * * * *